United States Patent [19]

Mittelhäuser

[11] Patent Number: 5,074,653
[45] Date of Patent: Dec. 24, 1991

[54] EXTERNAL REAR VIEW MIRROR FOR MOTOR VEHICLES

[76] Inventor: Bernhard Mittelhäuser, Am Krähenberg, 3002, Wedemark, Fed. Rep. of Germany

[21] Appl. No.: 458,785

[22] Filed: Dec. 29, 1989

[30] Foreign Application Priority Data

Jan. 2, 1989 [DE] Fed. Rep. of Germany ...... 3900022

[51] Int. Cl.⁵ ............................ G02B 5/08; G02B 7/18
[52] U.S. Cl. .................................................. 359/841
[58] Field of Search ............... 350/604, 605, 607–608, 350/630–637, 600; 248/900, 473–498, 549

[56] References Cited

U.S. PATENT DOCUMENTS

| 3,495,896 | 2/1970 | Barcus et al. | 248/477 |
| 4,279,473 | 7/1981 | Yamana | 350/635 |
| 4,523,736 | 6/1985 | Manzoni | 350/635 |
| 4,592,529 | 6/1986 | Suzuki | 350/604 |
| 4,636,045 | 1/1987 | Suzuki | 350/632 |
| 4,712,891 | 12/1987 | Midorikawa et al. | 350/604 |
| 4,822,140 | 4/1989 | Mittelhauser | 350/279 |
| 4,828,215 | 5/1989 | Mittelhauser | 350/635 |
| 4,840,475 | 6/1989 | Herzog et al. | 350/604 |
| 4,872,636 | 10/1989 | Mittelhauser et al. | 248/900 |
| 4,969,727 | 11/1990 | Harloff et al. | 248/900 |

FOREIGN PATENT DOCUMENTS

| 124448 | 7/1984 | Japan | 350/631 |
| 53442 | 3/1985 | Japan | 350/604 |
| 12453 | 1/1986 | Japan | 350/631 |
| 611551 | 7/1986 | Japan | 350/632 |

Primary Examiner—Bruce Y. Arnold
Assistant Examiner—Thong Nguyen
Attorney, Agent, or Firm—Robert W. Becker & Associates

[57] ABSTRACT

An external mirror for a motor vehicle, including a housing provided with two swivel pins that are disposed one behind the other in the longitudinal direction of the vehicle for allowing the housing to be swiveled toward the front or the rear out of the operative position and into a position that extends approximately parallel to the longitudinal direction of the vehicle. So that the mirror housing can be retained in this parallel position, an abutment support that limits the swiveling of the housing is provided for that swivel pin that leaves its journal position during the swiveling movement.

6 Claims, 1 Drawing Sheet

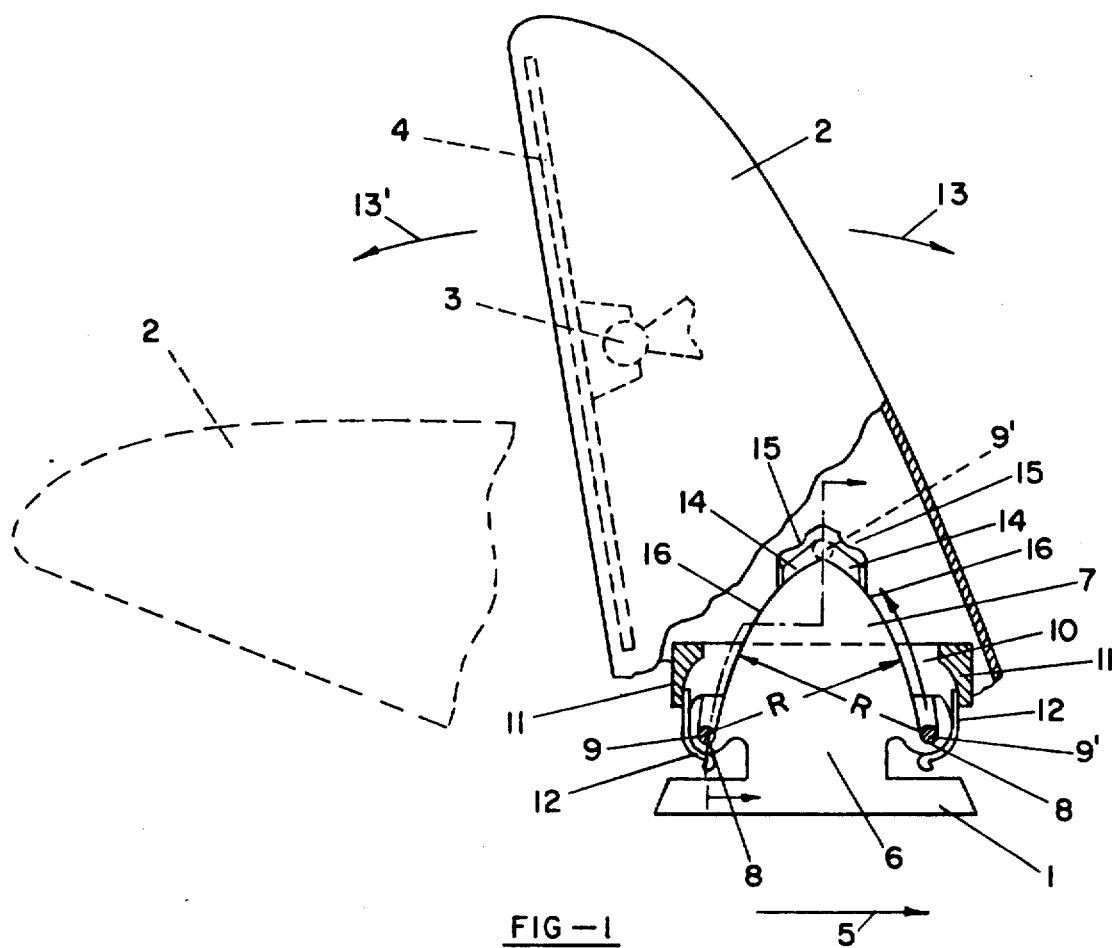
FIG—1
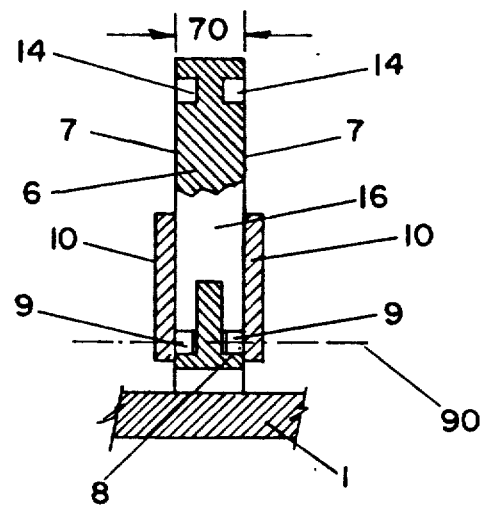
FIG—2

EXTERNAL REAR VIEW MIRROR FOR MOTOR VEHICLES

BACKGROUND OF THE INVENTION

The present invention relates to an external side or rear view mirror for a motor vehicle, including a housing that accommodates a mirror panel and is provided with two swivel pins that are disposed one behind the other in the longitudinal direction of the vehicle and in an operative position of use of the mirror, are disposed in journal means such that the housing, about an axis defined by one of the swivel pins, can be swiveled, in either of two opposite directions, out of the operative position, in which the housing is disposed essentially perpendicular to the longitudinal direction of the vehicle, and into a swiveled end position in which the housing is disposed essentially parallel to the longitudinal direction of the vehicle.

This ability of the housing, along with the mirror panel that is disposed therein, to be able to swivel is advantageous; in the event that the mirror is bumped or struck, the mirror housing can deflect in one or the other direction, thereby generally also preventing damage to the mirror.

Pursuant to the present invention, this possibility for being able to deflect the mirror housing should be maintained, while at the same time making it possible for the housing to be retained in the pivoted position (at least in a position that is approximately parallel to the longitudinal axis of the vehicle), in order in this way to be able to allocate to the mirror a so-called park position.

It is therefore an object of the present invention to embody a mirror of the aforementioned general type in such a way that it can be moved into a position that is parallel t o the longitudinal direction of the vehicle, and can be retained in this position.

BRIEF DESCRIPTION OF THE DRAWING

This object, and other objects and advantages of the present invention, will appear more clearly from the following specification in conjunction with the accompanying schematic drawing, in which:

FIG. 1 is a partially broken away and cross-sectioned plan view of one exemplary embodiment of the inventive rear view mirror in an operative position of use; and FIG. 2 is a partial cross-sectional view taken along the line II—II in FIG. 1.

SUMMARY OF THE INVENTION

The mirror of the present invention is characterized primarily by abutment support means for the other of the swivel pins, which during swiveling of the housing out of the operative position leaves its journal means; expediently, for the swiveled position an arresting means is associated with the swivel pin, with this arresting means preferably being in the form of a spring and, when the housing swivels, catching in a stop position but also being capable of being conveyed out of this stop position when a certain mechanical action is expended and it is desired to move the mirror back into its operative position, where the housing extends essentially perpendicular to the longitudinal direction of the vehicle.

Accordingly, the housing, along with the mirror panel, can be swiveled out of the operative position either to the front or to the rear, to thereby obtain one of the aforementioned park positions.

The abutment support means is preferably embodied in such a way that it is disposed at the end of a guide means for the swivel pins, so that the swivel pins cannot lift out of the journal means or abutment support means.

Further specific features of the present invention will be described in detail subsequently.

DESCRIPTION OF THE PREFERRED EMBODIMENTS

Referring now to the drawing in detail, the mirror essentially comprises a base which is securely mounted on the vehicle, a dish-shaped housing 2, which in the forward direction of travel of the vehicle is open toward the rear, and in addition a mirror panel 4 that is disposed in the opening of the housing 2 and is adjustable in all directions via a ball-and-socket joint 3, which is indicated by dashed lines. The forward direction of travel of the vehicle, which is also the longitudinal direction of the vehicle, is indicated by the arrow 5.

Secured to the base is an approximately plate-shaped holder 6 that is provided with side of abutment surfaces 7 that are parallel to one another and extend approximately horizontally (FIG. 2); one of the abutment surfaces 7 is disposed on top, and the other is disposed on at the bottom of the holder 6. At that end facing the vehicle, i.e. the base 1, the holder 6 is provided with two spaced-apart journal locations or means 8 that are disposed at the front and at the rear as viewed in the longitudinal direction of the vehicle (FIG. 1); these journal locations 8 have a pocket-shaped, channel-like configuration.

The two journal locations 8 serve to receive respective pairs of swivel pins 9, 9' which at each journal location 8 are disposed on both sides of the holder 6 and engage in the corresponding journal locations 8, which are, also disposed on both sides. The swivel pins 9, 9' of each journal location 8 in the form of stubs that are arranged in pairs and are aligned with one another (FIG. 2), and are secured on the inside of plate-like members 10 that are spaced apart by a distance 70 that corresponds to the distance between the two abutment surfaces 7, i.e. the thickness of the holder 6. The members 10 are integral parts of the housing 2 and are interconnected via crosspieces 11, which serve for the securement of leaf-type springs 12. At their free end, these leaf-type springs 12 have a curved or arcuate configuration and extend around round means of the journal locations 8 from the outside in such a way that both springs 12 always try to hold the two pairs of swivel pins 9, 9' in the position illustrated in FIG. 1, whereby the housing 2 with the mirror panel 4 also maintains this position.

In order to be able to swivel the housing 2 either in the direction of the arrow 13 or in the direction of the arrow 13', and into a position that is approximately parallel to the longitudinal direction of the vehicle (see, for example, the swiveled end or park position indicated by dashed lines in FIG. 1), it is necessary to overcome the holding force of one or the other of the leaf-type springs 12. In so doing, by pivoting the members 10 about one of the pairs of swivel pins 9, 9', the other pair of swivel pins 9, 9' reaches an end position at the free end of the holder 6, which at that location is also provided on both sides with abutment support means in the form of channel-like grooves or recesses 14. The one pair of swivel pin 9, 9' finds support here, so that one of the aforementioned swiveled end or park positions of the housing 2 is achieved. In this end position, the spring 12 that has been swiveled along with the members 10 engages the recess 15 that is disposed on the outer surface of the free end of the holder 6. The spring 12 and recess 15 form a releasable arresting means that assures that the housing 2 will be held securely in the pivoted or swiveled position.

As a result of this procedure, the housing 2, after being swiveled either in the direction of the arrow 13 or the arrow 13', can be securely held in the end position. An oppositely directed force first overcomes the spring 12 (this is the releasable aspect of the arresting means) and finally establishes the normal position of the housing 2 illustrated in FIG. 1.

The side surfaces 16 of the holder 6 can be curved in conformity with a radius R that is defined by the distance between the two swivel pins 9, 9'. The grooves 14, or the curved grooves in the vicinity of the journal locations 8, can extend over the entire swivel path of the pins 9, 9'. However this is not absolutely necessary, because a good guidance is provided by the members 10 that rest against the side or abutment surfaces 7; in addition, the pair of swivel pin 9, 9' that has not been lifted out of the journal location 8 does not permit changes in position of the housing 2 in a radial direction, in other words, this pair of pins acts like pivot or swivel pins that are journalled in a sleeve.

The support means for the end position of the swivel pins 9, 9' can be configured in different ways. For example, the grooves 14 that are disposed on both sides of the free end of the holder 6 could also end shortly before this free end and need not, as illustrated in FIG. 1, merge into one another. The important thing is that a fixation of the housing 2 takes place when the swivelling movement has been completed. However, it must be possible to release this fixation (in the illustrated embodiment by overcoming the spring force) in order to guarantee that the housing can be swiveled back into the normal or operating position.

It is to be understood that in order to provide proper guidance, the recesses of the journal means 8, and the grooves or recesses 14, have a width that corresponds to that of the swivel pins.

Thus, pursuant to the present invention, the external mirror can be moved into a park position that is directed either toward the front or toward the rear, and can remain in this position.

The present invention is, of course, in no way restricted to the specific disclosure of the specification and drawing, but also encompasses any modifications within the scope of the appended claims.

What I claim is:

1. An external rear view mirror for a motor vehicle, including a mirror housing that accommodates a mirror panel and is provided with two swivel pins that are disposed one behind the other in a longitudinal direction of said vehicle and, in an operative position of use of said mirror, are disposed in respective journal means such that said mirror housing can be swiveled about an axis defined by one of said swivel pins, in either of two opposite directions, out of said operative position, in which said housing is disposed essentially perpendicular to said longitudinal direction of said vehicle, and into a swiveled position in which said housing is disposed essentially parallel to said longitudinal direction of said vehicle, said mirror further comprising:

a base for connection to said vehicle;

a holder that is connected to said base, with said holder being provided with said journal means for said swivel pins of said housing, and with said holder being further provided with essentially horizontal side surfaces that extend substantially parallel to one another and serve for guidance of said housing during swiveling thereof; and abutment support means provided on said holder for the other of said swivel pins, which during swiveling of said housing out of said operative position cleaves its journal means, with said abutment support means serving to limit swiveling movement of said housing out of said operative position and into said position that is essentially parallel to said longitudinal direction of said vehicle, whereby each of said journal means is provided on both of said side surfaces of said holder, and each of said swivel pins comprises two stubs that are aligned with one another in such a way that each stub of a given swivel pin extends into oppositely disposed portions of a given one of said journal means.

2. A mirror according to claim 1, in which each of said journal means comprises two pocket-shaped, channel-like recesses into which said swivel pin stubs pass before coming to rest in said operative position of said housing.

3. A mirror according to claim 2, in which said abutment support means includes a channel-like groove into which said swivel pin passes before coming to rest in a swiveled position of said housing.

4. A mirror according to claim 3, in which said recesses of said journal means and said groove of said abutment support means have a width that corresponds to that of said swivel pins.

5. A mirror according to claim 3, in which said holder has lateral surfaces that extend perpendicular to said side surfaces thereof and face said swivel pins, with said lateral surfaces having a curvature that is defined by a radius that corresponds to the spacing between said two swivel pins.

6. An external rear view mirror for a motor vehicle, including a mirror housing that accommodates a mirror panel and is provided with two swivel pins that are disposed one behind the other in a longitudinal direction of said vehicle and, in an operative position of use of said mirror, are disposed in journal means such that said mirror housing can be swiveled about an axis defined by one of said swivel pins, in either of two opposite directions, out of said operative position, in which said housing is disposed essentially perpendicular to said longitudinal direction of said vehicle, and into a swiveled position in which said housing is disposed essentially parallel to said longitudinal direction of said vehicle, said mirror further comprising:

abutment support means provided on a holder for the other of said swivel pins, which during swiveling of said housing out of said operative position leaves its journal means, with said abutment support means serving to limit swiveling movement of said housing out of said operative position and into said position that is essentially parallel to said longitudinal direction of said vehicle; and releasable arresting means for said housing in the swiveled position thereof, with said arresting means also serving to arrest said mirror housing in said operative position thereof, whereby said arresting means includes: leaf-type spring means connected to said housing; rounded means as part of said journal means for engaging said spring means; and recess means in the vicinity of said abutment support means for engaging said spring means in a swiveled position of said housing.

* * * * *